United States Patent
Bergström et al.

(10) Patent No.: US 12,213,003 B2
(45) Date of Patent: Jan. 28, 2025

(54) ERROR HANDLING FOR RRC SEGMENTATION

(71) Applicant: Telefonaktiebolaget LM Ericsson (PUBL), Stockholm (SE)

(72) Inventors: Mattias Bergström, Sollentuna (SE); Malik Wahaj Arshad, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 347 days.

(21) Appl. No.: 17/772,364

(22) PCT Filed: Sep. 17, 2020

(86) PCT No.: PCT/SE2020/050866
§ 371 (c)(1),
(2) Date: Apr. 27, 2022

(87) PCT Pub. No.: WO2021/086243
PCT Pub. Date: May 6, 2021

(65) Prior Publication Data
US 2022/0408311 A1     Dec. 22, 2022

Related U.S. Application Data

(60) Provisional application No. 62/929,437, filed on Nov. 1, 2019.

(51) Int. Cl.
*H04W 28/06* (2009.01)
*H04W 76/19* (2018.01)

(52) U.S. Cl.
CPC ......... *H04W 28/065* (2013.01); *H04W 76/19* (2018.02)

(58) Field of Classification Search
CPC .. H04W 28/065; H04W 76/19; H04L 1/1848; H04L 1/1829
See application file for complete search history.

(56) References Cited

U.S. PATENT DOCUMENTS

2003/0061557 A1* 3/2003 Chao ............... H04L 1/1809
                                                            714/748
2022/0264684 A1* 8/2022 Wu .................. H04W 28/065

OTHER PUBLICATIONS

3GPP TS 36.331 v15.7.0; Technical Specification; 3rd Generation Partnership Project; Technical Specification Group Radio Access Network; Evolved Universal Terrestrial Radio Access (E-UTRA); Radio Resource Control (RRC); Protocol specification (Release 15)—Sep. 2019.

(Continued)

*Primary Examiner* — Ji-Hae Yea
(74) *Attorney, Agent, or Firm* — Baker Botts L.L.P.

(57) ABSTRACT

Systems and methods are disclosed herein that enable a wireless communication device (WCD) and/or a network node to perform a recovery action(s) when a failure occurs during reception, at the WCD, of a segmented Radio Resource Control (RRC) message. Embodiments of a method performed by a WCD are disclosed. In one embodiment, a method performed by a WCD comprises receiving one or more segments of a segmented RRC message and determining that an error has occurred before a last segment of the segmented RRC message has been received. The method further comprises, upon determining that the error has occurred before the last segment of the segmented RRC message has been received, performing one or more recovery actions. In this manner, a situation where the WCD combines segments of a first RRC message with segments of a second RRC message is avoided and, hence, errors due to such combining are avoided.

9 Claims, 7 Drawing Sheets

(56) References Cited

OTHER PUBLICATIONS

3GPP TSG-RAN2 Meeting #104; Spokane, USA; Source: Oppo; Title: Discussion on UE Capability Segmentation (R2-1816464)—Nov. 12-16, 2018.

3GPP TSG-RAN2 Meeting #104; Spokane, Washington, USA; Source: Huawei, HiSilicon; Title: Segmentation of UE Radio Capability Information (R2-1817648)—Nov. 12-16, 2018.

3GPP TSG-RAN2 Meeting #108; Reno, NV; Change Request; Title: Introduction of RRC Segmentation—Downlink; Source to WG: Ericsson, Deutsche Telekom, Vodafone, AT&T, Apple, Qualcomm Incorporated, Oppo, KT, Turkcell, Verizon (R2-1915763)—Nov. 18-22, 2019.

PCT International Search Report issued for International application No. PCT/SE2020/050866—Dec. 7, 2020.

PCT Written Opinion of the International Searching Authority issued for International application No. PCT/SE2020/050866—Dec. 7, 2020.

3GPP TSG-RAN WG2 #107, Prague, Czech Republic, Aug. 26-30, 2019; Agenda Item: 11.20.1 (RAN2 led TEI16 enhancements—Control plane related); Source: Ericsson, Deutsche Telekom; Title: Segmentation in DL (R2-1909610 (R2-1907325)).

3GPP TSG-RAN WG2 Meeting #107; Prague, Czech Republic, Aug. 26-30, 2019; Agenda Item: 11.5.3; Source: Nokia, Nokia Shanghai Bell; Title: Segmentation of the UE capability signalling; WID/SID: RACS-RAN-Core—Release 16 (R2-1910033).

Notice of Reasons for Rejection issued for Chinese Application No. 2022-524922—Sep. 5, 2023.

\* cited by examiner

ERROR HANDLING FOR RRC SEGMENTATION

PRIORITY

This nonprovisional application is a U.S. National Stage Filing under 35 U.S.C. § 371 of International Patent Application Serial No. PCT/SE2020/050866 filed Sep. 17, 2020 and entitled "ERROR HANDLING FOR RRC SEGMENTATION" which claims priority to U.S. Provisional Patent Application No. 62/929,437 filed Nov. 1, 2019 both of which are hereby incorporated by reference in their entirety.

TECHNICAL FIELD

The present disclosure relates to a wireless network and, in particular, to Radio Resource Control (RRC) segmentation in a wireless network.

BACKGROUND

Radio Resource Control (RRC) is the protocol used in Third Generation Partnership Project (3GPP) systems to control the configuration of the User Equipment (UE), and hence the UE's operation. This protocol comprises messages which are encoded according to Abstract Syntax Notation One (ASN.1). The network node sends ASN.1-encoded messages comprising configuration parameters to the UE, and the UE decodes these messages and applies the configurations. In some cases these configurations may be very complicated and hence the messages used to describe the configuration become very complex and hence large in size.

There are limitations in the layers below the RRC layer in terms of maximum size of packets. This limit is 9 kilobytes (kB) in New Radio (NR) and 8188 kB in Long Term Evolution (LTE). The size of the RRC messages may exceed these limitations and, hence, the limitations become a limitation on how complicated or advanced the configurations provided from the network to the UE can be.

To circumvent these limitations, it is discussed to introduce segmentation of the RRC messages such that a large RRC message can be split up and sent in smaller parts, where each part does not exceed the limitations of the lower layers. If in NR the RRC message which the network intends to send to the UE is, say 20 kB, the network could split this into three segments and send the segments individually to the UE.

In order for the UE to know when all segments of an RRC message have been received, the network indicates with a flag for each segment if that segment is the last segment of the RRC message. When the UE receives the last segment of the RRC message, the UE can combine the segments to start decoding the RRC message.

It remains open for now whether the segments have indices which indicate which number this segment has.

SUMMARY

Systems and methods are disclosed herein that enable a wireless communication device (WCD) and/or a network node to perform a recovery action(s) when a failure occurs during reception, at the WCD, of a segmented Radio Resource Control (RRC) message. Embodiments of a method performed by a WCD are disclosed. In one embodiment, a method performed by a WCD comprises receiving one or more segments of a segmented RRC message and determining that an error has occurred before a last segment of the segmented RRC message has been received. The method further comprises, upon determining that the error has occurred before the last segment of the segmented RRC message has been received, performing one or more recovery actions. In this manner, a situation where the WCD combines segments of a first RRC message with segments of a second RRC message is avoided and, hence, errors due to such combining are avoided.

In one embodiment, performing the one or more recovery actions comprises discarding the one or more segments of the segmented RRC message.

In one embodiment, the error is a Radio Link Failure (RLF).

In one embodiment, determining that the error has occurred before the last segment of the segmented RRC message has been received comprises determining that a timer has expired before the last segment of the segmented RRC message has been received.

In one embodiment, determining that the error has occurred before the last segment of the segmented RRC message has been received comprises determining that not all segments of the segmented RRC message have been received by the WCD. In one embodiment, determining that not all segments of the segmented RRC message have been received by the WCD comprises determining that the one or more segments of the segmented RRC message are one or more first segments, but not all segments, of the segmented RRC message. In another embodiment, determining that not all segments of the segmented RRC message have been received by the WCD comprises determining that an indication that one of the one or more segments of the segmented RRC message is a last segment of the segmented RRC message has not been received.

Corresponding embodiments of a WCD are also disclosed. In one embodiment, a WCD is adapted to receive one or more segments of a segmented RRC message and determine that an error has occurred before a last segment of the segmented RRC message has been received. The WCD is further adapted to, upon determining that the error has occurred before the last segment of the segmented RRC message has been received, perform one or more recovery actions.

In one embodiment, the one or more recovery actions comprises discarding the one or more segments of the segmented RRC message.

In one embodiment, the error is a RLF.

In one embodiment, a WCD comprises one or more receivers and processing circuitry associated with the one or more receivers. The processing circuitry is configured to cause the WCD to receive one or more segments of a segmented RRC message and determine that an error has occurred before a last segment of the segmented RRC message has been received. The processing circuitry is further configured to cause the WCD to, upon determining (202) that the error has occurred before the last segment of the segmented RRC message has been received, perform one or more recovery actions.

In one embodiment, the one or more recovery actions comprises discarding the one or more segments of the segmented RRC message.

In one embodiment, the error is a RLF.

In another embodiment, a method performed by a WCD comprises receiving one or more segments, but not all segments, of a first segmented RRC message. The method further comprises receiving a first segment of a second segmented RRC message and, upon receiving the first segment of the second segmented RRC message, discarding the one or more segments of the first segmented RRC message.

In one embodiment, receiving the first segment of the second segmented RRC message comprises receiving a segment of an RRC message and determining that the segment of the RRC message is the first segment of the second RRC message. In one embodiment, determining that the segment of the RRC message is the first segment of the second RRC message comprises determining that the segment of the RRC message is the first segment of the second RRC message based on an index associated with the segment. In another embodiment, determining that the segment of the RRC message is the first segment of the second RRC message comprises determining that the segment of the RRC message is the first segment of the second RRC message based on an index associated with the segment and one or more indices associated with the one or more segments of the first segmented RRC message.

In one embodiment, the method further comprises receiving one or more remaining segments of the second segmented RRC message, and assembling the first segment of the second segmented RRC message and the one or more remaining segments of the second segmented RRC message, but not the one or more discarded segments of the first segmented RRC message, to provide an assembled RRC message. In one embodiment, the method further comprises performing one or more actions in accordance with the assembled RRC message.

Corresponding embodiments of a WCD are also disclosed. In one embodiment, a WCD is adapted to receive one or more segments, but not all segments, of a first segmented RRC message. The WCD is further adapted to receive a first segment of a second segmented RRC message and, upon receiving the first segment of the second segmented RRC message, discard the one or more segments of the first segmented RRC message.

In another embodiment, a WCD comprises one or more receivers and processing circuitry associated with the one or more receivers. The processing circuitry is configured to cause the WCD to receive one or more segments, but not all segments, of a first segmented RRC message, receive a first segment of a second segmented RRC message, and discard the one or more segments of the first segmented RRC message upon receiving the first segment of the second segmented RRC message.

Embodiments of a method performed by a network node of a wireless network are also disclosed. In one embodiment, a method performed by a network node of a wireless network comprises determining that a WCD has regained connection towards the wireless network after a failure and determining that at least one segment of a segmented RRC message was sent to the WCD prior to the failure and that not all segments of the segmented RRC message were successfully received by the WCD. The method further comprises, upon determining that the WCD has regained connection towards the wireless network after the failure and determining that at least one segment of the segmented RRC message was sent to the WCD prior to the failure and that not all segments of the segmented RRC message were successfully received by the WCD, performing one or more actions based on an assumption that the WCD has not applied the segmented RRC message.

In one embodiment, the failure is a RLF.

In one embodiment, the one or more actions comprise determining a new configuration for the WCD as a modification of an original configuration of the WCD without applying the segmented RRC message.

In one embodiment, the one or more actions comprise resending the segmented RRC message to the WCD.

Corresponding embodiments of a network node are also disclosed. In one embodiment, a network node for a wireless network is adapted to determine that a WCD has regained connection towards the wireless network after a failure and determine that at least one segment of a segmented RRC message was sent to the WCD prior to the failure and that not all segments of the segmented RRC message were successfully received by the WCD. The network node is further adapted to, upon determining that the WCD has regained connection towards the wireless network after the failure and determining that at least one segment of the segmented RRC message was sent to the WCD prior to the failure and that not all segments of the segmented RRC message were successfully received by the WCD, perform one or more actions based on an assumption that the WCD (112) has not applied the segmented RRC message.

In another embodiment, a network node for a wireless network comprises processing circuitry configured to cause the network node to determine that a WCD has regained connection towards the wireless network after a failure, and determine that at least one segment of a segmented RRC message was sent to the WCD prior to the failure and that not all segments of the segmented RRC message were successfully received by the WCD. The processing circuitry is further configured to cause the network node to, upon determining that the WCD has regained connection towards the wireless network after the failure and determining that at least one segment of the segmented RRC message was sent to the WCD prior to the failure and that not all segments of the segmented RRC message were successfully received by the WCD, perform one or more actions based on an assumption that the WCD (112) has not applied the segmented RRC message.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
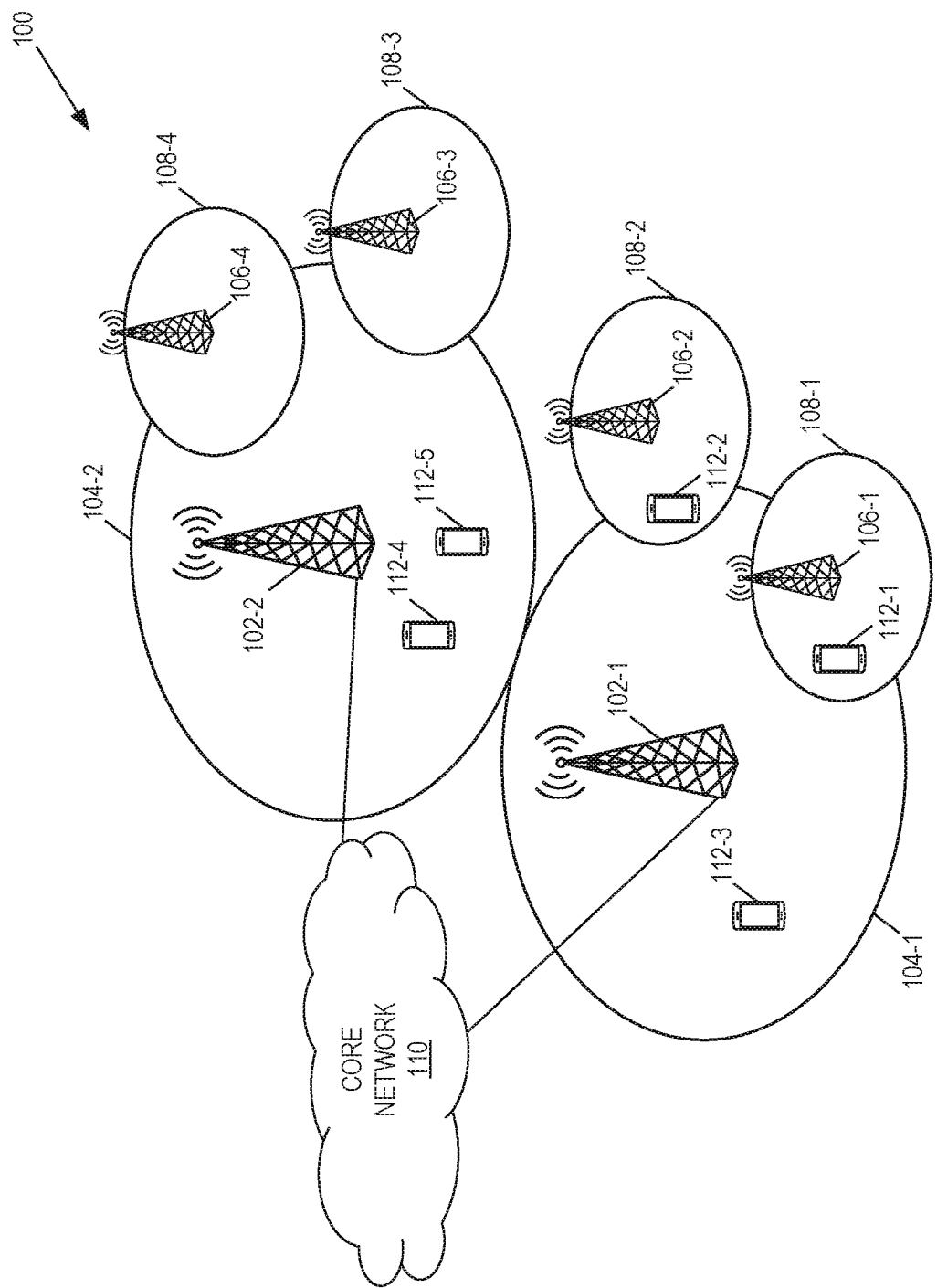
FIG. 1 illustrates one example of a cellular communications system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a UPF, a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device (WCD): One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s) with respect to Radio Resource Control (RRC) segmentation. In case the UE's radio connection with the network becomes poor, the UE detects so called Radio Link Failure (RLF). In this case, the UE will perform some actions to regain the connection to the network. For example, the UE will trigger an RRC connection reestablishment procedure to attempt to reestablish the connection with the network.

In case the UE has received some, but not all, segments of a segmented RRC message, the UE will keep some of the segments in a memory in order to assemble with the remaining segments as soon as they arrive. If the UE's radio connection with the network fails, for example like described above, while the UE has received some, but not all, segments of an RRC message, these segments would remain in the UE's memory. If the UE at a later point in time regains the connection with the network, the network may, after the connection has been regained, send another segmented RRC message to the UE. In this case, the UE may combine the segments received before the connection failed with the segments received after the connection was regained, but these segments may not necessarily be of the same RRC message. If they are of different RRC messages, the UE would assemble the segments which are from different messages and decoding of the message would fail, which will cause the UE's connection towards the network to fail.

Certain aspects of the present disclosure and their embodiments may provide solutions to the aforementioned or other challenges. Systems and methods are disclosed herein that enable a wireless communication device (WCD) to perform a recovery action(s) when a failure occurs during reception of a segmented Radio Resource Control (RRC) message. In some embodiments, a WCD determines that an error has occurred (e.g., a RLF) after the WCD has received at least one but not all segments of a segmented RRC message. Upon detecting the error, the WCD performs a recovery action(s). For example, the WCD discards the received segment(s) of the segmented RRC message.

In some embodiments, a WCD (e.g., a UE) determines that it has received at least one but not all segments of a segmented RRC message while an error happens, and then the WCD discards the received segments of the RRC message.

Certain embodiments may provide one or more of the following technical advantage(s). Embodiments of the present disclosure may avoid the situation where the WCD combines segments of a first RRC message with segments of a second RRC message and hence avoid errors due to such combining.

FIG. 1 illustrates one example of a cellular communications system 100 in which embodiments of the present disclosure may be implemented. In the embodiments described herein, the cellular communications system 100 is, e.g., a 5G system (5GS) including a Next Generation RAN (NG-RAN) (also referred to herein as a NR RAN), an Evolved Packet System (EPS) including an LTE RAN, or the like. In this example, the RAN includes base stations 102-1 and 102-2, which in the NG-RAN are referred to as gNBs (NR base station) or ng-eNBs (LTE RAN nodes connected to 5GC) and in the LTE RAN are referred to as eNBs, controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5GS is referred to as the 5G core (5GC). The base stations 102 (and optionally the low power nodes 106) are connected to the core network 110.

The base stations 102 and the low power nodes 106 provide service to wireless communication devices (WCDs) 112-1 through 112-5 in the corresponding cells 104 and 108. The WCDs 112-1 through 112-5 are generally referred to herein collectively as WCDs 112 and individually as WCD 112. In the following description, the WCDs 112 are oftentimes UEs, but the present disclosure is not limited thereto.

Figure 2:
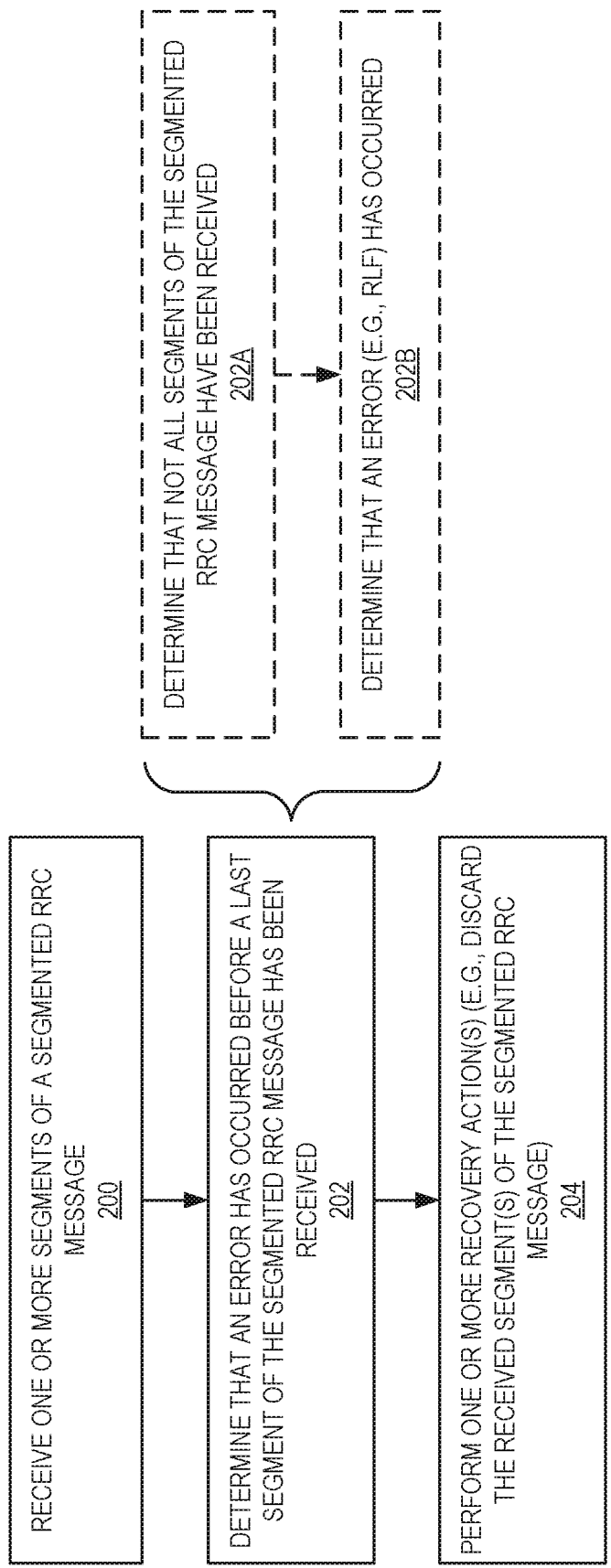
FIG. 2 is a flow chart that illustrates the operation of a wireless communication device (WCD) (e.g., a User Equipment (UE)) in accordance with some embodiments of the present disclosure.

FIG. 2 is a flow chart that illustrates the operation of a WCD 112 (e.g., a UE) in accordance with some embodiments of the present disclosure. Optional steps are represented with dashed lines/boxes. As illustrated, the WCD 112 receives one or more segments (but not all segments) of a segmented RRC message (step 200). The WCD 112 determines that an error (e.g., RLF) has occurred before a last segment of the segmented RRC message has been received by the WCD 112 (step 202). More specifically, in one embodiment, in order to determine that an error (e.g., RLF) has occurred before a last segment of the segmented RRC message has been received by the WCD 112, the WCD 112 determines that not all segments of the segmented RRC message have been received (step 202A) and determines that an error (e.g., RLF) has occurred (step 202B).

In some embodiments, the WCD 112 determines that not all segments of the segmented RRC message have been received by determining that the segment(s) received in step 200 is(are) the first segment(s), but not all segments, of a segmented RRC message. More generally, the WCD 112 determines that the segment(s) of the segmented RRC message received in step 200 are not all of the segments of the segmented RRC message.

In some embodiments, the WCD 112 may determine this by first determining that it has received (segment(s) of) an RRC message that is of a type of RRC message that can carry segments.

In some embodiments, the WCD 112 determines that the WCD 112 has not received all segments of the segmented RRC message using any desired mechanism. For example, in one embodiment, the WCD 112 determines that it has not received all segments of the segmented RRC message by determining that the WCD 112 has not received an indication for a segment that indicates that that segment is the last segment of the segmented RRC message. Hence, the WCD 112 is expecting to receive more segments of the message.

Note that once all segments of a message have been received, the WCD 112 may e.g., consider that it has not received a first segment of a segmented RRC message. It is assumed that the WCD 112 will, when it has received all segments of a message, assemble the message and apply it, but it would no longer consider itself to have received a first segment of a segmented RRC message.

In step 202, the WCD 112 determines that an error has occurred (or been triggered) before a last segment of the segmented RRC message has been received (i.e., while the WCD 112 still expects more segment(s) of the segmented RRC message) as follows. In some embodiment, the failure may be, e.g.:

a RLF detected by the WCD 112, or
expiration of a timer X. The timer X may be started when the WCD 112 receives the first segment of the segmented RRC message. The timer may in some version of this embodiment be re-started when the WCD 112 receives a new segment of the segmented message. The value of timer X may be preconfigured in the WCD 112, e.g. based on a specified value in a specification, or it may be configured in the WCD 112 by a network node (such as a gNB/eNB), etc.

Upon determining that an error has occurred before a last segment of the segmented RRC message has been received by the WCD 112, the WCD 112 performs one or more recovery action(s) (i.e., one or more recovery mechanism(s)) (step 204). Such a recovery mechanism is performed in order to avoid that the WCD 112 applies some segments received prior to the failure, with segments which are received after the failure. One example of a recovery mechanism is that the WCD 112 discards the segments received so far.

Note that the WCD 112 may not necessarily know how many segments there are in total but it knows that it has so far received, e.g., 3 segments and those 3 segments are not all segments of the segmented message.

When it here says "discard" segments, it may mean one or more of the following: that the WCD 112 considers them invalid, that the WCD 112 erases them from a memory, that the WCD 112 considers the memory wherein the segments are stored. Regardless of which action(s) the UE takes, the WCD 112 refrains from using the segment in a later segmented RRC message assembly procedure.

Another example of a recovery mechanism is that the WCD 112 determines the segments as no longer valid or applicable, etc. If the WCD 112 at a later point receives segments from the network, the WCD 112 would not combine those (new) segments with segments which are not considered valid or applicable.

Below is illustrated one example implementation of some aspects of the process performed by the WCD 112 described above. This example implementation is illustrated as a change compared to current specification, where changes are shown with underlined text.

WCD 112 would not attempt to combine those segments with segments of a new message which is being sent to the WCD 112 after the connection was regained.

Figure 3:
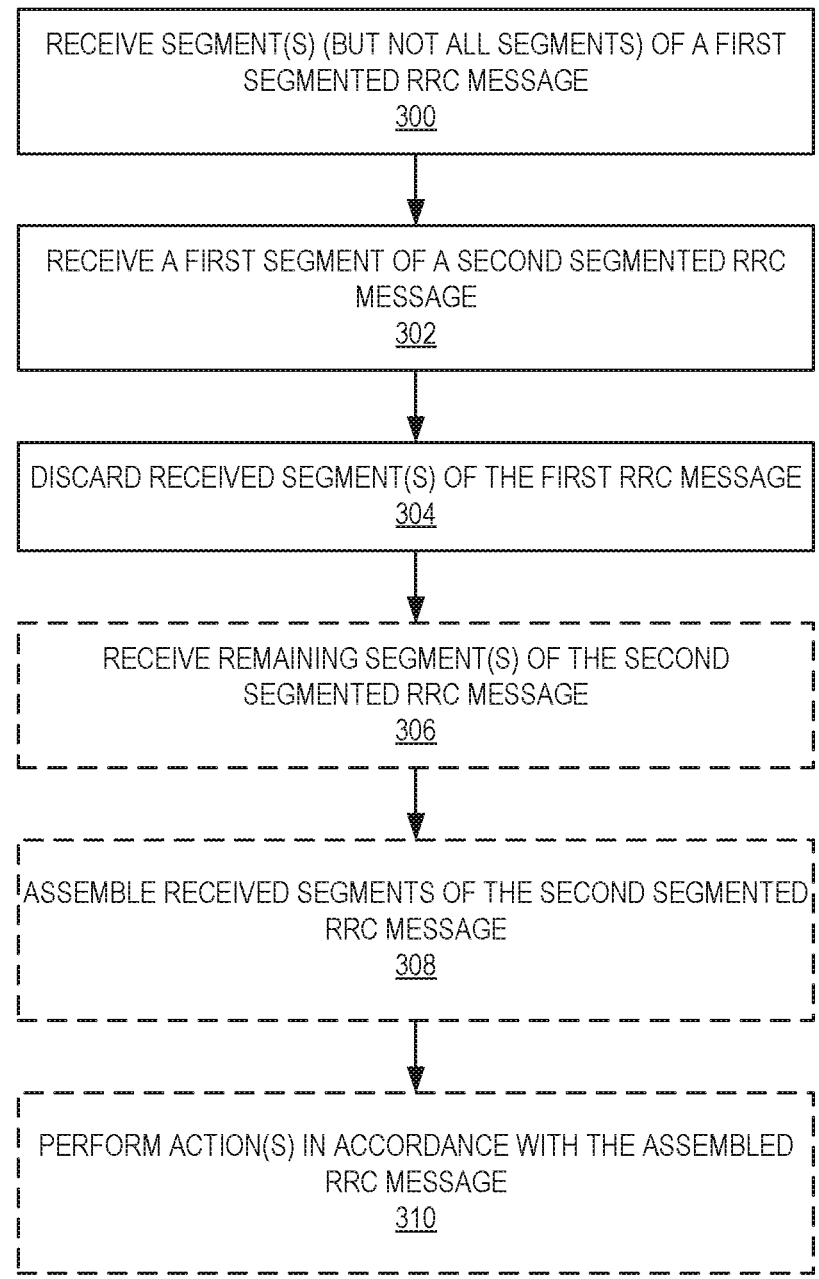
FIG. 3 is a flow chart that illustrates the operation of a WCD (e.g., a UE) in accordance with some other embodiments of the present disclosure.

FIG. 3 is a flow chart that illustrates the operation of a WCD 112 (e.g., a UE) in accordance with at least some aspect of the embodiments above. Optional steps are represented with dashed lines/boxes. As illustrated, the WCD 112 receives one or more segments, but not all segments, of a first segmented RRC message (step 300). For example, these segments may consist of three segments having index numbers 0, 1, and 3, respectively. The WCD 112 receives a first segment of a second segmented RRC message (step 302). For example, this segment may have an index of 0, which indicates that it is a first segment of a segmented RRC message (i.e., the second segmented RRC message). Upon receiving the first segment of the second segmented RRC message, the WCD 112 discards the received segment(s) of the first RRC message.

The WCD 112 may receive one or more remaining segments of the second segmented RRC message (step 306). The WCD 112 may assemble the received segments of the second segmented RRC message (step 308). The WCD 112 may then perform one or more action(s) in accordance with the assembled RRC message (step 310).

Now, a description of some network related embodiments will be provided. In one embodiment, the network (e.g., a network node such as, e.g., a base station 102) determines

---

5.3.10.3 Detection of radio link failure

The UE shall:
1> upon T310 expiry in PCell; or
1> upon random access problem indication from MCG MAC while neither T300, T301, T304, T311 nor T319 are running; or
1> upon indication from MCG RLC that the maximum number of retransmissions has been reached:
   2> if the indication is from MCG RLC and CA duplication is configured and activated, and for the corresponding logical channel allowedServingCells only includes SCell(s):
      3> initiate the failure information procedure as specified in 5.7.5 to report RLC failure.
   2> else:
      3> consider radio link failure to be detected for the MCG i.e. RLF;
      3> discard all RRC segments received, if any;
      3> if AS security has not been activated:
         4> perform the actions upon going to RRC_IDLE as specified in 5.3.11, with release cause 'other';-
      3> else if AS security has been activated but SRB2 and at least one DRB have not been setup:
         4> perform the actions upon going to RRC_IDLE as specified in 5.3.11, with release cause 'RRC connection failure';
      3> else:
         4> initiate the connection re-establishment procedure as specified in 5.3.7.

---

In another set of embodiments, a WCD 112 (e.g., UE) will upon reception of a segment of a message determine if the segment is the first segment of the message. This may be determined based on a number indicating which segment number this segment is. If the WCD 112 determines that this segment is the first segment of a message, the UE discards, or in some other way consider invalid, any segments of the previous message.

For example, if the WCD 112 has received three segments so far and they have had, in this order, index number 0, 1, and 2. And if the WCD 112 then receives another segment with number 0, the WCD 112 may determine this segment to be of a new message and the WCD 112 would discard the previous segments, i.e. the previous number 0, 1, and 2. This has the benefit that if the WCD 112 received some, but not all, segments of a message before a connection failed, the that a WCD 112 (e.g., a UE) has regained connection towards the network after an RLF event or similar failure. The network further determines if the network has sent at least one segment of a segmented RRC message to the WCD 112 prior to the failure (e.g., RLF event) and that not all segments of the segmented RRC message have been successfully sent to the WCD 112 and that the WCD 112 has acknowledged the reception of those segments.

Acknowledgement of successful reception of the segments may be considered acknowledgement indications on e.g. HARQ-level by a HARQ ACK, on RLC-level by a RLC ACK, or on RRC level (by an RRCReconfigurationComplete message).

If the network has sent RRC segments to the WCD 112 and the WCD 112 triggers RLF, the methods above describe how the WCD 112 recovers from the situation by e.g.

discarding the so-far-received RRC segments. The network (e.g., a network node such as, e.g., a base station 102) would, if it determines that it has sent RRC segments to a WCD 112 but the WCD 112 has not received all of the segments, determine that the transmission of the segmented RRC message has failed and hence assume that the WCD 112 has not applied it, i.e. not even those segments which the WCD 112 has received successfully, if any.

The network then assumes that the configuration of the WCD 112 is as it was without having applied the segmented RRC message. This configuration will here be referred to as the "original configuration" of the WCD 112.

If, or when, the network later wants to reconfigure the UE it would do those reconfigurations as a modification towards the original configuration of the WCD 112, not the configuration the WCD 112 would have had in case the WCD 112 had applied the segmented RRC message.

Further, if the WCD 112 regains the connection but this time the WCD 112 gets connected to another network cell or node than it was connected to prior to the RLF, the new cell (referred to as the "target node") would request the configuration of the WCD 112 (also known as the context of the WCD 112) from the node to which the WCD 112 was connected prior to the RLF (referred to as the "source node"). The source node would, if it determines that the WCD 112 has not received all segments of an RRC message, consider the configuration of the WCD 112, or "context" of the WCD 112, to be the one without having applied the segmented RRC message.

If the network determines when the WCD 112 has regained the connection with the network, that the wanted WCD 112 configuration is the one which the segmented RRC message was intended to achieve, the network may resent the segmented RRC message to the WCD 112.

Figure 4:
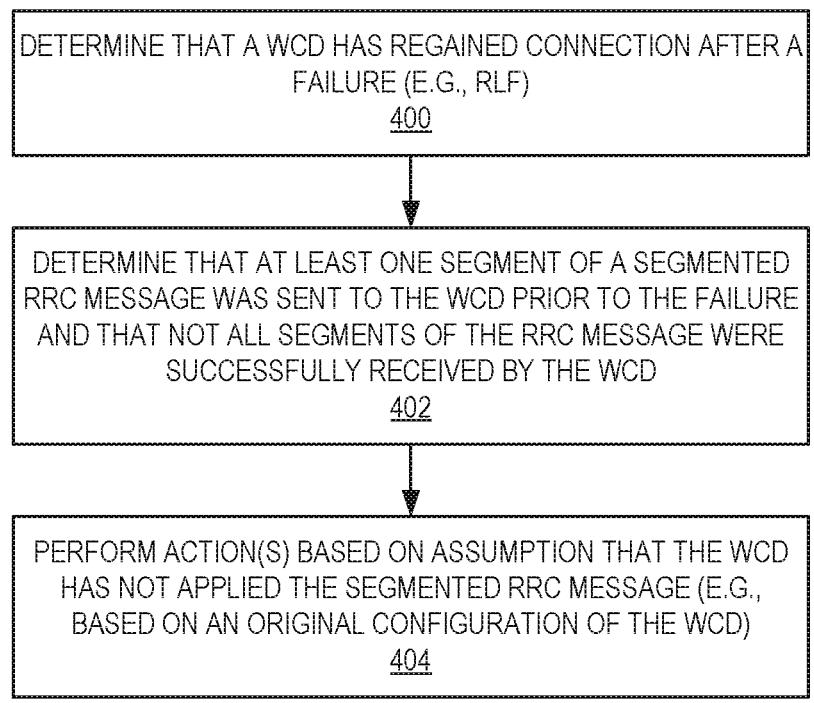
FIG. 4 is a flow chart that illustrates the operation of a network node (e.g., a base station) in accordance with some embodiments of the present disclosure.

FIG. 4 is a flow chart that illustrates the operation of a network node (e.g., a base station 102) in accordance with at least some aspect of the embodiments above. Optional steps are represented with dashed lines/boxes. As illustrated, the network node determines that a WCD 112 (e.g., a UE) has regained connection towards the network after a failure (e.g., after a RLF) (step 400). The network node also determines that at least one segment of a segmented RRC message was sent to the WCD 112 prior to the failure and that no all segments of the RRC message were successfully received by the WCD 112, as described above (step 402). Upon determining that at least one segment of a segmented RRC message was sent to the WCD 112 prior to the failure and that no all segments of the RRC message were successfully received by the WCD 112, the network node performs one or more actions based on an assumption that the WCD 112 has not applied the segmented RRC message, as described above (step 404). For example, the network node may perform one or more actions based on an original configuration of the WCD 112 (i.e., a configuration of the WCD 112 prior to the segmented RRC message). As another example, the network node may determine a new configuration of the WCD 112 as a modification to the original configuration of the WCD 112, instead of as a modification of the configuration of the WCD 112 if the segmented RRC message had been applied by the WCD 112. As another example, the network node may resend the segmented RRC message to the WCD 112.

RRC may be implemented in a cloud environment and the embodiments described herein for an RRC entity (mainly in the WCD 112 but the network may need to take corresponding actions), hence this may be implemented in a cloud environment.

Figure 5:
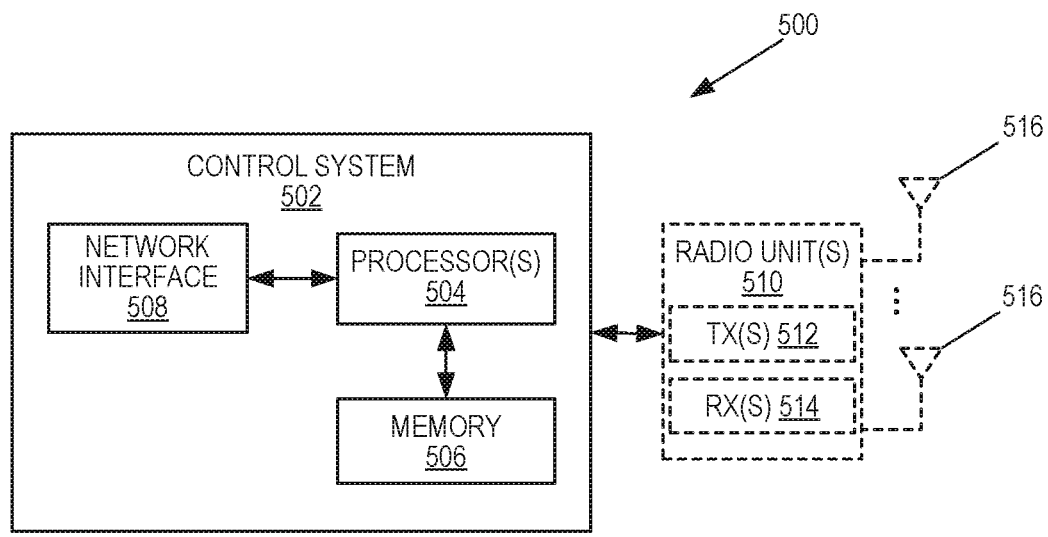
FIGS. 5 through 7 are schematic block diagrams of a network node (e.g., a base station) in accordance with some embodiments of the present disclosure.

FIG. 5 is a schematic block diagram of a network node 500 according to some embodiments of the present disclosure. Optional features are represented by dashed boxes. The network node 500 may be, for example, a base station 102 or 106 or a network node that implements all or part of the functionality of the base station 102, eNB, or gNB described herein. As illustrated, the network node 500 includes a control system 502 that includes one or more processors 504 (e.g., Central Processing Units (CPUs), Application Specific Integrated Circuits (ASICs), Field Programmable Gate Arrays (FPGAs), and/or the like), memory 506, and a network interface 508. The one or more processors 504 are also referred to herein as processing circuitry. In addition, if the network node 500 is a radio access node, the network node 500 may include one or more radio units 510 that each includes one or more transmitters 512 and one or more receivers 514 coupled to one or more antennas 516. The radio units 510 may be referred to or be part of radio interface circuitry. In some embodiments, the radio unit(s) 510 is external to the control system 502 and connected to the control system 502 via, e.g., a wired connection (e.g., an optical cable). However, in some other embodiments, the radio unit(s) 510 and potentially the antenna(s) 516 are integrated together with the control system 502. The one or more processors 504 operate to provide one or more functions of a network node 500 as described herein (e.g., one or more functions of a network node described above, e.g., with respect to FIG. 4). In some embodiments, the function(s) are implemented in software that is stored, e.g., in the memory 506 and executed by the one or more processors 504.

Figure 6:
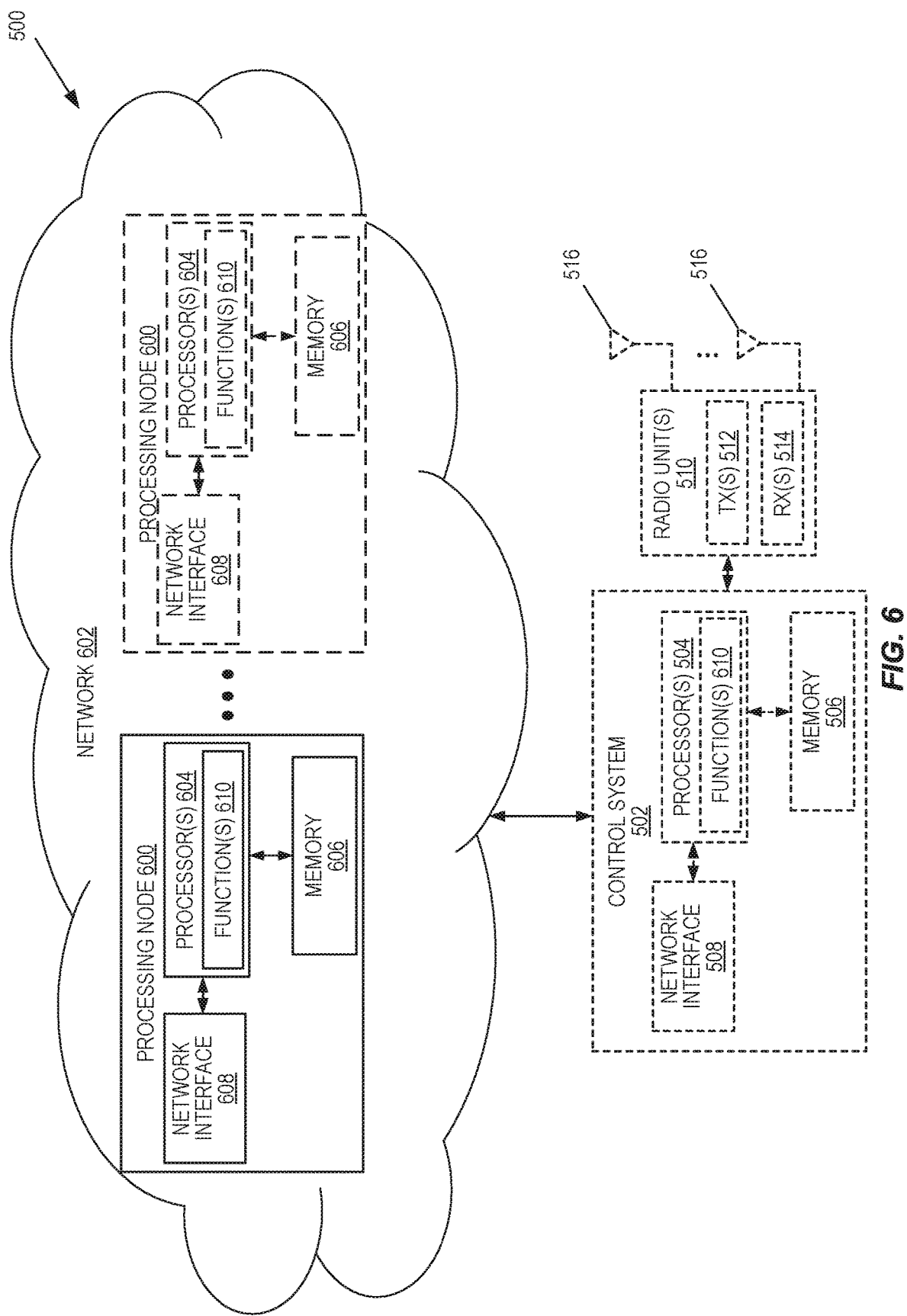

FIG. 6 is a schematic block diagram that illustrates a virtualized embodiment of the network node 500 according to some embodiments of the present disclosure. As used herein, a "virtualized" network node is an implementation of the network node 500 in which at least a portion of the functionality of the network node 500 is implemented as a virtual component(s) (e.g., via a virtual machine(s) executing on a physical processing node(s) in a network(s)). As illustrated, in this example, the network node 500 includes one or more processing nodes 600 coupled to or included as part of a network(s) 602. Each processing node 600 includes one or more processors 604 (e.g., CPUs, ASICs, FPGAs, and/or the like), memory 606, and a network interface 608. If the network node 500 is a radio access node, the network node 500 may include the control system 502 and/or the one or more radio units 510, as described above. If present, the control system 502 or the radio unit(s) are connected to the processing node(s) 600 via the network 602.

In this example, functions 610 of the network node 500 described herein (e.g., one or more functions of a network node described above, e.g., with respect to FIG. 4) are implemented at the one or more processing nodes 600 or distributed across the one or more processing nodes 600 and the control system 502 and/or the radio unit(s) 510 in any desired manner. In some particular embodiments, some or all of the functions 610 of the network node 500 described herein are implemented as virtual components executed by one or more virtual machines implemented in a virtual environment(s) hosted by the processing node(s) 600.

In some embodiments, a computer program including instructions which, when executed by at least one processor, causes the at least one processor to carry out the functionality of the network node 500 (e.g., one or more functions of a network node described above, e.g., with respect to FIG. 4) or a node (e.g., a processing node 600) implementing one or more of the functions 610 of the network node 500 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 7:
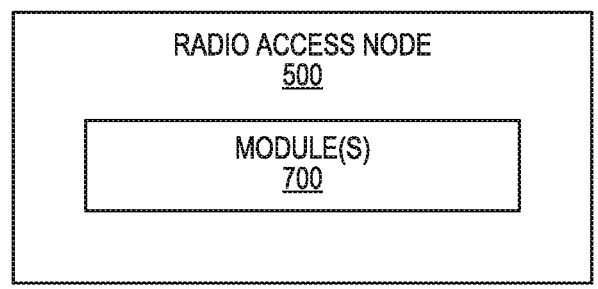

FIG. 7 is a schematic block diagram of the network node 500 according to some other embodiments of the present disclosure. The network node 500 includes one or more modules 700, each of which is implemented in software. The module(s) 700 provide the functionality of the network node 500 described herein (e.g., one or more functions of a network node described above, e.g., with respect to FIG. 4). This discussion is equally applicable to the processing node 600 of FIG. 6 where the modules 700 may be implemented at one of the processing nodes 600 or distributed across multiple processing nodes 600 and/or distributed across the processing node(s) 600 and the control system 502.

Figure 8:
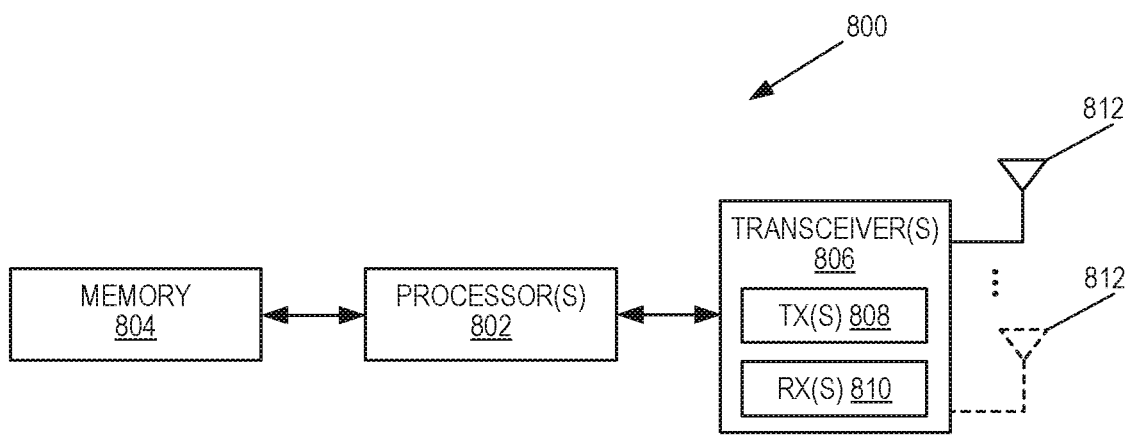
FIGS. 8 and 9 are schematic block diagrams of a WCD in accordance with some embodiments of the present disclosure.

FIG. 8 is a schematic block diagram of a wireless communication device 800 according to some embodiments of the present disclosure. As illustrated, the wireless communication device 800 includes one or more processors 802 (e.g., CPUs, ASICs, FPGAs, and/or the like), memory 804, and one or more transceivers 806 each including one or more transmitters 808 and one or more receivers 810 coupled to one or more antennas 812. The transceiver(s) 806 includes radio-front end circuitry connected to the antenna(s) 812 that is configured to condition signals communicated between the antenna(s) 812 and the processor(s) 802, as will be appreciated by on of ordinary skill in the art. The processors 802 are also referred to herein as processing circuitry. The transceivers 806 are also referred to herein as radio circuitry. In some embodiments, the functionality of the wireless communication device 800 described above may be fully or partially implemented in software that is, e.g., stored in the memory 804 and executed by the processor(s) 802. Note that the wireless communication device 800 may include additional components not illustrated in FIG. 8 such as, e.g., one or more user interface components (e.g., an input/output interface including a display, buttons, a touch screen, a microphone, a speaker(s), and/or the like and/or any other components for allowing input of information into the wireless communication device 800 and/or allowing output of information from the wireless communication device 800), a power supply (e.g., a battery and associated power circuitry), etc.

In some embodiments, a computer program including instructions which, when executed by at least one processor, causes the at least one processor to carry out the functionality of the wireless communication device 800 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
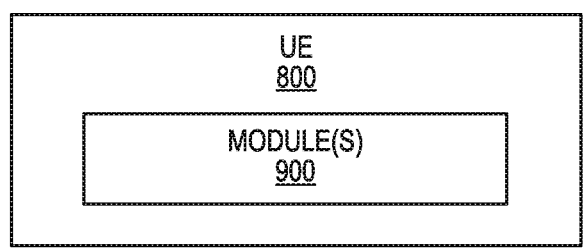

FIG. 9 is a schematic block diagram of the wireless communication device 800 according to some other embodiments of the present disclosure. The wireless communication device 800 includes one or more modules 900, each of which is implemented in software. The module(s) 900 provide the functionality of the wireless communication device 800 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Group A Embodiments

Embodiment 1: A method performed by a wireless communication device (112), the method comprising: receiving (200) one or more segments of a segmented RRC message; determining (202) that an error has occurred before a last segment of the segmented RRC message has been received; and, upon determining (202) that the error has occurred before the last segment of the segmented RRC message has been received, performing (204) one or more recovery actions.

Embodiment 2: The method of embodiment 1 wherein performing (204) the one or more recovery actions comprises discarding the one or more segments of the segmented RRC message.

Embodiment 3: The method of embodiment 1 wherein performing (204) the one or more recovery actions comprises discarding the one or more segments of the segmented RRC message that were received prior to the error.

Embodiment 4: The method of any of embodiments 1 to 3 wherein the error is a RLF.

Embodiment 5: The method of any of embodiments 1 to 4 wherein determining (202) that the error has occurred before the last segment of the segmented RRC message has been received comprises determining (202A) that not all segments of the segmented RRC message have been received by the wireless communication device (112).

Embodiment 6: The method of any of embodiments 1 to 4 wherein determining (202) that the error has occurred before the last segment of the segmented RRC message has been received comprises determining (202A) that not all segments of the segmented RRC message have been received by the wireless communication device (112) before the error has occurred.

Embodiment 7: The method of embodiment 5 or 6 wherein determining (202A) that not all segments of the segmented RRC message have been received by the wireless communication device (112) comprises determining that the one or more segments of the segmented RRC message are one or more first segments, but not all segments, of the segmented RRC message.

Embodiment 8: The method of embodiment 5 or 6 wherein determining (202A) that not all segments of the segmented RRC message have been received by the wireless communication device (112) comprises determining that an indication that one of the one or more segments of the segmented RRC message is a last segment of the segmented RRC message has not been received.

Embodiment 9: A method performed by a wireless communication device (112), the method comprising: receiving (300) one or more segments, but not all segments, of a first segmented RRC message; receiving (302) a first segment of a second segmented RRC message; and, upon receiving (302) the first segment of the second segmented RRC message, discarding (304) the one or more segments of the first segmented RRC message.

Embodiment 10: The method of embodiment 9 wherein receiving (302) the first segment of the second segmented RRC message comprises receiving a segment of an RRC message and determining that the segment of the RRC message is the first segment of the second RRC message.

Embodiment 11: The method of embodiment 10 wherein determining that the segment of the RRC message is the first segment of the second RRC message comprises determining that the segment of the RRC message is the first segment of the second RRC message based on an index associated with the segment.

Embodiment 12: The method of embodiment 10 wherein determining that the segment of the RRC message is the first segment of the second RRC message comprises determining that the segment of the RRC message is the first segment of the second RRC message based on an index associated with the segment and one or more indices associated with the one or more segments of the first segmented RRC message.

Embodiment 13: The method of any of embodiments 9 to 12 further comprising: receiving (306) one or more remaining segments of the second segmented RRC message; and assembling (308) the first segment of the second segmented RRC message and the one or more remaining segments of the second segmented RRC message, but not the one or more discarded segments of the first segmented RRC message, to provide an assembled RRC message.

Embodiment 14: The method of embodiment 13 further comprising performing (310) one or more actions in accordance with the assembled RRC message.

Group B Embodiments

Embodiment 15: A method performed by a network node (e.g., a base station) of a wireless network, the method comprising: determining (400) that a wireless communication device (112) has regained connection towards the wireless network after a failure; determining (402) that at least one segment of a segmented RRC message was sent to the wireless communication device (112) prior to the failure and that not all segments of the segmented RRC message were successfully received by the wireless communication device (112); and, upon determining (400) that the wireless communication device (112) has regained connection towards the wireless network after the failure and determining (402) that at least one segment of the segmented RRC message was sent to the wireless communication device (112) prior to the failure and that not all segments of the segmented RRC message were successfully received by the wireless communication device (112), performing (404) one or more actions based on an assumption that the wireless communication device (112) has not applied the segmented RRC message.

Embodiment 16: The method of embodiment 15 wherein the failure is a RLF.

Embodiment 17: The method of embodiment 15 or 16 wherein the one or more actions comprise determining a new configuration for the wireless communication device (112) as a modification of an original configuration of the wireless communication device (112) without applying the segmented RRC message.

Embodiment 18: The method of embodiment 15 or 16 wherein the one or more actions comprise resending the segmented RRC message to the wireless communication device (112).

Group C Embodiments

Embodiment 19: A wireless communication device f comprising: processing circuitry configured to perform any of the steps of any of the Group A embodiments; and power supply circuitry configured to supply power to the wireless communication device.

Embodiment 20: A base station comprising: processing circuitry configured to perform any of the steps of any of the Group B embodiments; and power supply circuitry configured to supply power to the base station.

Embodiment 21: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
    5G Fifth Generation
    5GC Fifth Generation Core
    5GS Fifth Generation System
    AF Application Function
    AMF Access and Mobility Function
    AN Access Network
    AP Access Point
    ASIC Application Specific Integrated Circuit
    AUSF Authentication Server Function
    CPU Central Processing Unit
    DN Data Network
    DSP Digital Signal Processor
    eNB Enhanced or Evolved Node B
    EPS Evolved Packet System
    E-UTRA Evolved Universal Terrestrial Radio Access
    FPGA Field Programmable Gate Array
    gNB New Radio Base Station
    gNB-DU New Radio Base Station Distributed Unit
    HSS Home Subscriber Server IoT Internet of Things
IP Internet Protocol
LTE Long Term Evolution
MME Mobility Management Entity
MTC Machine Type Communication
NEF Network Exposure Function
NF Network Function
NR New Radio
NRF Network Function Repository Function
NSSF Network Slice Selection Function
OTT Over-the-Top
PC Personal Computer
PCF Policy Control Function
P-GW Packet Data Network Gateway
QoS Quality of Service
RAM Random Access Memory
RAN Radio Access Network
ROM Read Only Memory
RRH Remote Radio Head
RU Round Trip Time
SCEF Service Capability Exposure Function
SMF Session Management Function
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

What is claimed is:

1. A method performed by a wireless communication device, the method comprising:
    receiving one or more segments of a segmented Radio Resource Control (RRC) message;
    determining that a Radio Link Failure (RLF) has occurred before a last segment of the segmented RRC message has been received; and
    upon determining that the error has occurred before the last segment of the segmented RRC message has been received, discarding the one or more received segments of the segmented RRC message,
    wherein determining that the error has occurred before the last segment of the segmented RRC message has been received comprises determining that a timer has expired before the last segment of the segmented RRC message has been received.

2. The method of claim 1 wherein determining that the error has occurred before the last segment of the segmented RRC message has been received comprises determining that not all segments of the segmented RRC message have been received by the wireless communication device.

3. The method of claim 2 wherein determining that not all segments of the segmented RRC message have been received by the wireless communication device comprises determining that the one or more segments of the segmented RRC message are one or more first segments, but not all segments, of the segmented RRC message.

4. The method of claim 2 wherein determining that not all segments of the segmented RRC message have been received by the wireless communication device comprises determining that an indication that one of the one or more segments of the segmented RRC message is a last segment of the segmented RRC message has not been received.

5. A wireless communication device comprising:
    one or more receivers; and
    processing circuitry associated with the one or more receivers, the processing circuitry configured to cause the wireless communication device to:
    receive one or more segments of a segmented Radio Resource Control (RRC) message;
    determine that an Radio Link Failure (RLF) has occurred before a last segment of the segmented RRC message has been received; and
    upon determining that the error has occurred before the last segment of the segmented RRC message has been received discarding the one or more segments of the RRC message,
    wherein the processing circuitry is operable to determine that the error has occurred before the last segment of the segmented RRC message has been received by determining that a timer has expired before the last segment of the segmented RRC message has been received.

6. A method performed by a network node of a wireless network, the method comprising:
    determining that a wireless communication device has regained connection towards the wireless network after a Radio Link Failure (RLF);
    determining that at least one segment of a segmented Radio Resource Control (RRC) message was sent to the wireless communication device prior to the RLF and that not all segments of the segmented RRC message were successfully received by the wireless communication device; and
    upon determining that the wireless communication device has regained connection towards the wireless network after the RLF and determining that at least one segment of the segmented RRC message was sent to the wireless communication device prior to the RLF and that not all segments of the segmented RRC message were successfully received by the wireless communication device, performing one or more actions based on an assumption that the wireless communication device has not applied the segmented RRC message.

7. The method of claim 6 wherein the one or more actions comprise determining a new configuration for the wireless communication device as a modification of an original configuration of the wireless communication device without applying the segmented RRC message.

8. The method of claim 6 wherein the one or more actions comprise resending the segmented RRC message to the wireless communication device.

9. A network node for a wireless network, the network node comprising processing circuitry configured to cause the network node to:
    determine that a wireless communication device has regained connection towards the wireless network after a Radio Link Failure (RLF);
    determine that at least one segment of a segmented Radio Resource Control (RRC) message was sent to the wireless communication device prior to the RLF and that not all segments of the segmented RRC message were successfully received by the wireless communication device; and upon determining that the wireless communication device has regained connection towards the wireless network after the RLF and determining that at least one segment of the segmented RRC message was sent to the wireless communication device prior to the RLF and that not all segments of the segmented RRC message were successfully received by the wireless communication device, perform one or more actions based on an assumption that the wireless communication device has not applied the segmented RRC message.

* * * * *

UNITED STATES PATENT AND TRADEMARK OFFICE
CERTIFICATE OF CORRECTION

PATENT NO. : 12,213,003 B2
APPLICATION NO. : 17/772364
DATED : January 28, 2025
INVENTOR(S) : Bergström et al.

Page 1 of 1

It is certified that error appears in the above-identified patent and that said Letters Patent is hereby corrected as shown below:

In the Specification

In Column 5, Line 64, delete "Mobility" and insert -- Mobility Management --, therefor.

In Column 13, Line 31, delete "on" and insert -- one --, therefor.

In Column 16, Line 53, delete "Mobility" and insert -- Mobility Management --, therefor.

In Column 17, Line 21, delete "RU" and insert -- RTT --, therefor.

Signed and Sealed this
Seventh Day of October, 2025

John A. Squires
*Director of the United States Patent and Trademark Office*